Figure 1:
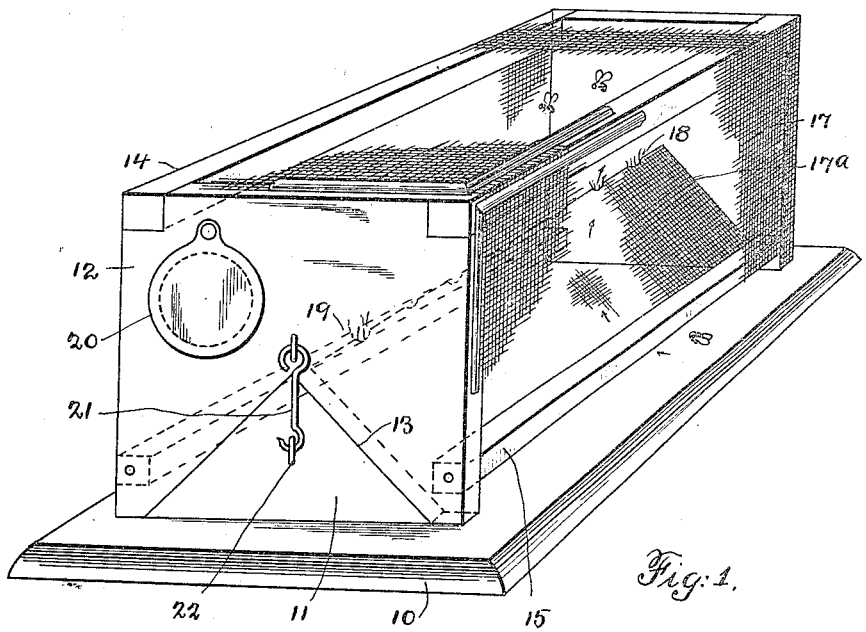

T. F. McDONOUGH, Jr.
FLY TRAP.
APPLICATION FILED OCT. 30, 1916.

1,229,107.

Patented June 5, 1917.

Thomas F. McDonough Jr. Inventor.
By his Attorney,
W. B. Hutchinson,

UNITED STATES PATENT OFFICE.

THOMAS F. McDONOUGH, JR., OF GLEN COVE, NEW YORK.

FLY-TRAP.

1,229,107.

Specification of Letters Patent.

Patented June 5, 1917.

Application filed October 30, 1916. Serial No. 128,493.

*To all whom it may concern:*

Be it known that I, THOMAS F. McDONOUGH, Jr., a citizen of the United States, and a resident of Glen Cove, Nassau county, New York, have invented a new and useful Improvement in Fly-Traps, of which the following is a full, clear, and exact description.

My invention relates to improvements in fly traps and the object of my invention is to produce a very simple and inexpensive structure which will catch flies alive and hold them securely. More particularly the object of my invention is to produce a fly trap having a base portion on which bait can be placed, and a removable trap portion which the flies will naturally enter, the whole being constructed in a simple manner and in such a way that the parts can be very easily united or separated, and the trapped flies removed when necessary.

Reference is to be had to the accompanying drawings forming a part of this specification, in which similar reference characters indicate corresponding parts in all the views.

Figure 2:
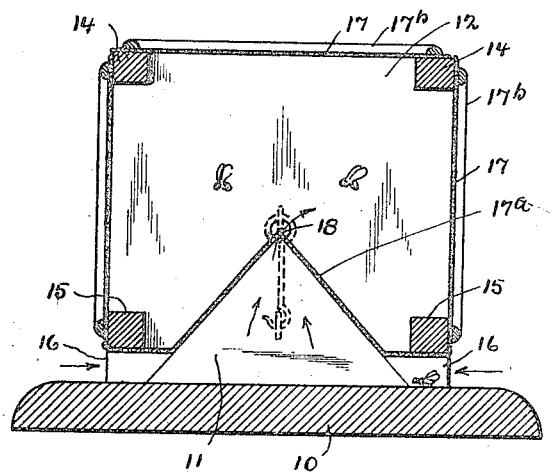

Figure 1 is a perspective view of the complete trap, and Fig. 2 is a cross section of the same.

The structure is provided with a base 10 which is preferably flat and can be conveniently made of wood, though of course other materials can be used, this base having spaced apart and rising from the upper side thereof two uprights 11, which are preferably of an A shape, although they can be given any desired outline. The trap proper has two ends 12 which on their lower edges are cut away as shown at 13 so as to set over the uprights 11 and fit snugly thereon, the side portions of the end bottoms preferably resting upon the base 10 so as to give to the trap more stability. It will be readily seen that the ends should be cut away at 13 to fit the uprights 11, and that these may be given any desired shape, though that shown is preferable. The end portions 12 of the trap form the ends of the skeleton framework having rails 14 at the top corners connecting the two ends 12, while near the bottom and on opposite sides are the lower rails 15 which are likewise secured to the ends, and these are raised a little from the base 10 so as to form passageways 16 extending the full length of the trap, these passageways occurring between the base 10 and the members 15 as shown clearly in Fig. 2.

The sides, top and bottom of the trap are covered with screening 17, and the screening is secured to the inner walls of the cutaway part 13 of the ends 12, thus forming an A shaped chamber 17ª extending longitudinally of the trap and having at its apex numerous openings 18 through which the flies may pass. The screen material around the holes 18 is cut so as to have some of the wire members 19 of the screen stick upward around the holes. This, while simple, is important, because if it were not for these prongs 19, the flies might pass backward out of the trap; but with the prongs the flies will not attempt to crawl back as the prongs interfere with the outward passage of the flies.

As least one end of the trap is provided with a door 20 of any suitable kind, covering an opening through the trap end, and when the flies have collected in the trap they will die in a short time, or can be killed as by drowning, and then emptied through the door.

A suitable catch is preferably used to fasten the top part of the trap to the base, and a convenient way is to provide hasps 21 on the trap ends which engage staples 22 on the uprights 11 as shown in the drawings. The screening 17 of the trap can be applied in any convenient way, and I have shown it fastened in place by beading 17ᵇ which overlaps the screening and is tacked to the trap ends and rails, but obviously any other suitable means can be employed.

When the trap is to be used, some sort of bait attractive to flies is placed on the base 10 beneath the chamber 17ª. The flies attracted by the bait enter through the passageway 16, and after eating the bait will naturally fly upward against the walls of the chamber 17ª and will crawl upward along these walls toward the higher and lighter part of the trap, finally passing through the holes 18, through which they will not return because of the interference of the prongs 19, and even if the prongs were not used, most of the flies would still remain in the trap. When a sufficient number of flies have been caught, the top of the trap is lifted from the base and the flies can be emptied as already described.

From the foregoing description it will be seen that by having the base provided with uprights which serve to support and guide the body portion of the trap, and by having this body portion separable from the base, a very convenient and simple structure is made and a trap provided which can be easily set, conveniently moved about, and readily emptied.

I claim:—

1. A fly trap comprising a flat base which serves as a feed board, triangular uprights spaced apart and rigidly secured to the base, a removable member having closed ends provided with ways shaped to fit over the aforesaid triangular uprights and with the parts of the ends at the sides of the uprights shaped to rest upon the base, said removable member having its sides and top screen covered, and a screen covered triangular upwardly extending member in the bottom having a fly opening at the apex, and one of the ends of the said member having an opening therethrough and a door covering the opening.

2. A fly trap comprising two separable members, first a flat base portion having uprights spaced apart and rigidly supported thereon, and second a removable screen covered chamber having its ends closed and shaped to fit over the aforesaid uprights and its side portions spaced apart from the base, the said second member having oppositely inclined inwardly extending bottom portions with a slot through the apex thereof.

3. A fly trap comprising two separable members, first, a base portion having triangular end portions spaced apart and rigidly attached thereto, and second a removable screen covered chamber portion having its ends provided with rigid ways shaped to fit over the triangular members and with its sides spaced apart from the base to provide passageways between the sides and the base, and screen covered upwardly extending oppositely inclined bottom portions having an ingress slot at the apex thereof.

THOMAS F. McDONOUGH, Jr.

Witnesses:
W. W. OLIVER,
D. WAYNE HALLETT,
VERNON WALDRON,
WILBUR BENNETT.